(12) United States Patent
Fünfer

(10) Patent No.: US 6,619,149 B2
(45) Date of Patent: Sep. 16, 2003

(54) SWITCH TRANSMISSION UNIT FOR COMBINED SWITCHING OF A GEAR

(75) Inventor: Josef Fünfer, Königsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/093,206

(22) Filed: Mar. 7, 2002

(65) Prior Publication Data

US 2002/0124668 A1 Sep. 12, 2002

(30) Foreign Application Priority Data

Mar. 12, 2001  (DE) .......................... 101 11 746

(51) Int. Cl.⁷ ................................................. F16H 3/08
(52) U.S. Cl. ............................. 74/329; 74/331; 173/48
(58) Field of Search .......................... 74/329, 335, 331; 173/48, 109

(56) References Cited

U.S. PATENT DOCUMENTS 6,015,017 A  * 1/2000 Lauterwald .................. 173/48
6,510,903 B2 * 1/2003 Funfer ......................... 173/48

FOREIGN PATENT DOCUMENTS

DE  2511469 A1  *  9/1976
DE  4000822 A1  *  7/1991

* cited by examiner

Primary Examiner—Dirk Wright
(74) Attorney, Agent, or Firm—Sidley Austin Brown & Wood, LLP

(57) ABSTRACT

A transmission (1) for a hand tool device with two laterally spaced shafts (2, 2') having parallel axes (A, A'). which can be switched using switch sleeves (3, 3') arranged movable in an axially limited manner on the shafts, whereby both switch sleeves (3, 3') are switchably coupled to one another by a switch transmission unit (4) in a rotationally free axially form-fitting manner and engaging into the switch sleeves and which are resiliently spring-biased along the axes (A, A') by a spring arrangement (6).

15 Claims, 2 Drawing Sheets

SWITCH TRANSMISSION UNIT FOR COMBINED SWITCHING OF A GEAR

FIELD OF THE INVENTION

The invention relates to a switch transmission unit for the combined switching of two switch sleeves of a transmission, arranged in particular for the transmission of a hand tool device such as a combination hammer drill for the purpose of switching between from rotary, rotary hammer and chiseling operation.

BACKGROUND OF THE INVENTION

In the transitional range of different modes of operation, the configuration of a spring-force assisted switching arrangement by using spring-resilient elements is conventional, wherein the internally selected switch position is determined by the stable condition of the spring-resilient element.

Switch synchronization of an axially limited movable switch sleeve arranged coaxially one to each rotational shaft of a hand tool device by means of spring-biased elements as such is well-known from DE2511469.

According to EP0437716 three operating modes in a hand tool device can be selected using a rotary switch that is switchably coupled by way of a switch spring for synchronization with an axially displaceable gear shaft.

According to U.S. Pat. No. 6,015,017, four operating modes in a hand tool devices are selected using a rotary switch, which using an eccentric cam, switches a prestressed initial switch sleeve and using a cam disk and a spring-biased pusher plate in contact with the disk for the synchronization of a second switch sleeve arranged perpendicular to the first switch sleeve.

SUMMARY OF THE INVENTION

The object of the invention is to provide a synchronization switch sequence for two switch sleeves arranged on parallel shafts for the purpose of combined switching of a transmission with at least three operating modes.

Essentially a transmission for a hand tool device has two shafts arranged with this axis parallel and spaced laterally apart, each of its shafts being capable of being switched using an axially limited movable switch sleeve arranged coaxial to the shaft, wherein both switch sleeves are switchably coupled to one other by means of a switch transmission unit that engages into the switch sleeves in a rotation-free, axially positively locked fashion and which is spring-biased along the axis by a spring element.

As a result, in a hand tool with a shaft for a rotary drive and a shaft for an impact drive and parallel to each other, both of which mesh with the common drive pinion, effects a synchronized switching of both using the coupled switch sleeves of the switch transmission unit and, relative to a switch position predetermined by an initial switch sleeve, achieves a switch sequence of the synchronization of the second switch sleeve.

Advantageously, the switch transmission unit is comprised of transmission parts spring-elastically biased by springs, which further advantageously are comprised of a shaped metal plate and are thus simple to manufacture.

In an advantageous manner, the transmission parts have in the axial direction guide surfaces for guidance along the axis.

Preferably, the springs are arranged as space-saving helical springs and further advantageously as a compact compression spring each of whose ends is associated with a transmission part.

Advantageously, the helical springs are arranged coaxially around a spring guide that in a limited manner movably couples both transmission parts along the axis, so that buckling of the helical springs on compressive stress is prevented and further guidance of both transmission parts is achieved.

In a preferred manner, the first transmission part is arranged with a guide part, shaped as an annular sleeve along the axis between two guide parts of the second transmission part, whereby two end stops limiting the movement along the axis between the transmission parts and oppositely extending changeable sections are formed therebetween.

Advantageously, two helical springs are arranged as a pair along two sections of the spring guide, each along the axis with one helical spring for each differently oriented section, whereby on compression or on expansion of the switch transmission unit different spring-elastic characteristics can be developed.

Advantageously, the spring guides or sleeves along the axis are fashioned hollow, and further sleeve-like, whereby the switch transmission unit as a whole can be mounted along a bearing element, which engages coaxially in the spring guide, and can be guided along the axis.

In a preferred manner the switch transmission unit has two, further symmetrically arranged, spring guides and associated bearing elements, guide elements and helical springs, whereby the helical springs can be displaced without swing by preservation of the symmetry from the middle zone into the edge zone of the switch transmission unit and consequently make possible a narrow arrangement.

Advantageously, the transmission unit includes an engagement element, shaped to be able to engage each switch sleeve transversely to the axis, rotationally-free and in a positive-locked manner in each switch sleeve. Further the engagement element is a shaped metal plate, so that the engagement element can be fabricated in a technologically simple manner in one piece with the transmission part.

Preferably, the engagement element has a arch-shaped, concave recess, configured to engage into a peripheral annular groove of the switch sleeve, whereby only minor, service life reducing contact compressions within an engagement sector of the annular groove of the switch sleeve are necessary.

Advantageously, only one transmission part is coupled with an actuation element located outside the transmission housing, and is spring-biased for synchronization, whereby at least three different transmission modes at one site can be switched in combination into at least three different axial switch positions.

BRIEF DESCRIPTION OF THE DRAWING

The invention is more completely explained with reference to an advantageous exemplary embodiment shown in the drawing where.

DETAILED DESCRIPTION OF THE INVENTION

Figure 1:
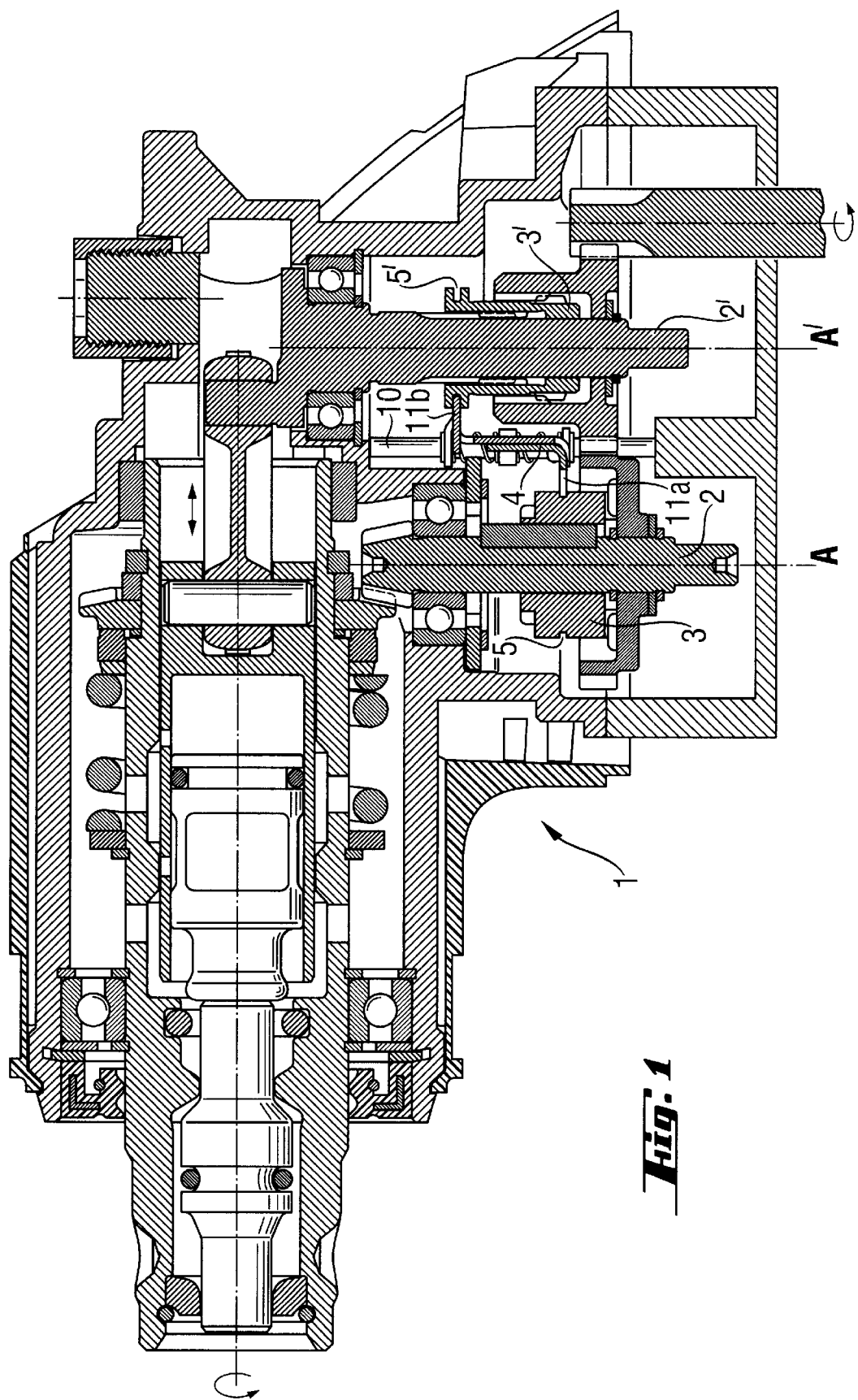
FIG. 1 is a sectional view of a transmission for a hand tool device.

In FIG. 1, a transmission 1 for a hand tool device (not shown) used as a pneumatic combination hammer is comprised of two shafts 2, 2' arranged with their axes A, A' parallel and spaced laterally apart and arranged for rotary drive and for impact drive, and each is switchable using an axially limited movable switch sleeve 3, 3' disposed coaxially on the shafts 2, 2', wherein both switch sleeves 3, 3' are switchably coupled to each other via a switch transmission unit 4, which respectively in a rotationally-free and positive-locking manner engages into peripheral annular grooves 5, 5' of the switch sleeves.

Figure 2:
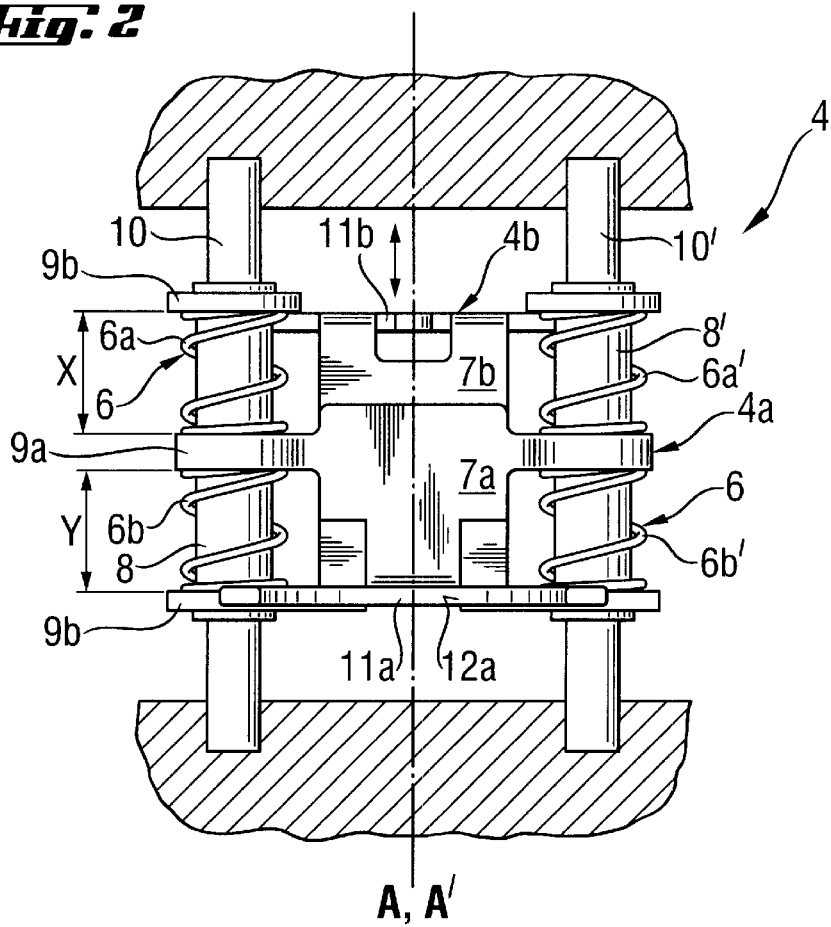
FIG. 2 has a switch transmission unit in detail in side view.

According to FIG. 2, the switch transmission unit 4 is made up of two transmission parts 4a, 4b formed of a shaped metal plate is spring-biased along the axis A, A' over a spring arrangement comprised of four compression springs that are associated at their ends with a different one of the transmission part 4a, 4b. The transmission parts 4a, 4b exhibit guide surfaces 7a, 7b for guidance along the axes A, A'. The individual helical springs 6a, 6b, 6a', 6b' are arranged coaxially around spring guides 8, 8', which connects both transmission parts 4a, 4b along the axes A, A' in a limited movably mariner. The first transmission part 4a is arranged with an annular sleeve-like configured guide part 9a along the axes A, A' and positioned between two guide parts 9b of the second transmission part 4b, whereby axially extending sections X, Y are formed, to which springs 6a, 6b are associated. The two sleeve-like spring guides 8, 8' are movably mounted along the axis A, A' on axially extending bearing elements 10, 10'. The switch transmission unit 4 has two spring guides 8, 8' arranged symmetrically in the edge zone, with respective associated bearing elements 10, 10', guide parts 9a, 9a', 9b, 9b' and helical springs 6a, 6a', 6b, 6b'.

Figure 3:
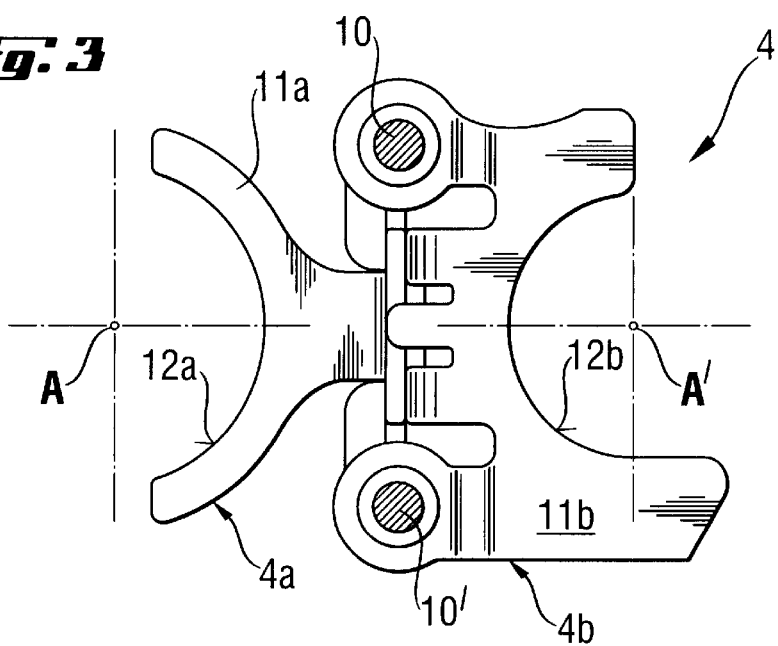
FIG. 3 is a top view of the switch transmission unit in FIG. 2.

According to FIG. 3 the transmission parts 4a, 4b have respectively an engagement element 11a, 11b, configured as a shaped metal plate transverse to the axes A, A' with a curved arch-shaped, concave recess 12a, 12b.

What is claimed is:

1. A transmission for a hand tool device comprised of two laterally spaced shafts (2, 2') with the axes (A, A'), thereof parallel to one another, each of said shafts (2, 2') being switchable to an axially limited extent by a switch sleeve (3, 3') each arranged coaxially with and mounted on a different one of said shafts, a switch transmission unit (4) coupled to each of said switch sleeves (3, 3') in a rotation free, form locked manner and spring biased along the axes (A, A') of said shafts by a spring arrangement (6).

2. A transmission, as set forth in claim 1, wherein said switch transmission unit (4) comprises transmission parts (4a, 4b) in engagement with a different one of said switch sleeves (3, 3') and spring biased by said spring arrangement (6).

3. A transmission, as set forth in the claim 2, wherein said transmission parts (4a, 4b) are formed by a shaped metal plate.

4. A transmission, as set forth in claim 3, wherein said transmission parts (4a, 4b) include guide surfaces (7a, 7b) extending in the direction of the axes of said shafts (2, 2') for guidance therealong.

5. A transmission, as set forth in claim 1, wherein said spring arrangement (6) is formed by space conserving helical springs (6a, 6a', 6b, 6b).

6. A transmission, as set forth in claim 5, wherein said helical springs (6a, 6a', 6b, 6b') are formed as compression springs.

7. A transmission, as set forth in claim 5, wherein said helical springs (6a, 6a', 6b, 6b') are arranged coaxially around two axially extending spring guides (8, 8'), and couple said transmission parts (4a, 4b) along said shafts (2, 2').

8. A transmission, as set forth in claim 7, wherein a first transmission part (4a) is engaged by guide parts (9a) to said spring guides (8, 8') between and axially spaced from two guide parts (9b) of a second transmission part (4b).

9. A transmission, as set forth in claim 8, wherein said guide parts (9a) are hollow ring-shaped elements.

10. A transmission, as set forth in claim 8, wherein two said helical springs (6a, 6a', 6b, 6b') are arranged as a pair extending along two axially extending sections (X, Y) of said spring guides.

11. A transmission, as set forth in claim 7, wherein said spring guides (8, 8') are symmetrically arranged.

12. A transmission, as set forth in claim 2, wherein said transmission parts (4a, 4b) each includes an engagement element (11a, 11b) spaced axially apart and extending transversely of said axes (A, A') and arrange to engage a different one of said switch sleeves (3, 3').

13. A transmission, as set forth in claim 12, wherein said engagement elements (11a, 11b) each comprise a plate-like member forming a concave shaped recess arranged to fit into an annular groove (5, 5') in one of said switch sleeves (3, 3').

14. A transmission, as set forth in claim 2, wherein a housing encloses said transmission unit 4, and an activation element accessible exteriorly of said housing and coupled to said transmissions unit (4) for operating said unit.

15. A transmission, as set forth in claim 14, wherein said activation element is spring biased.

* * * * *